Figure 1:
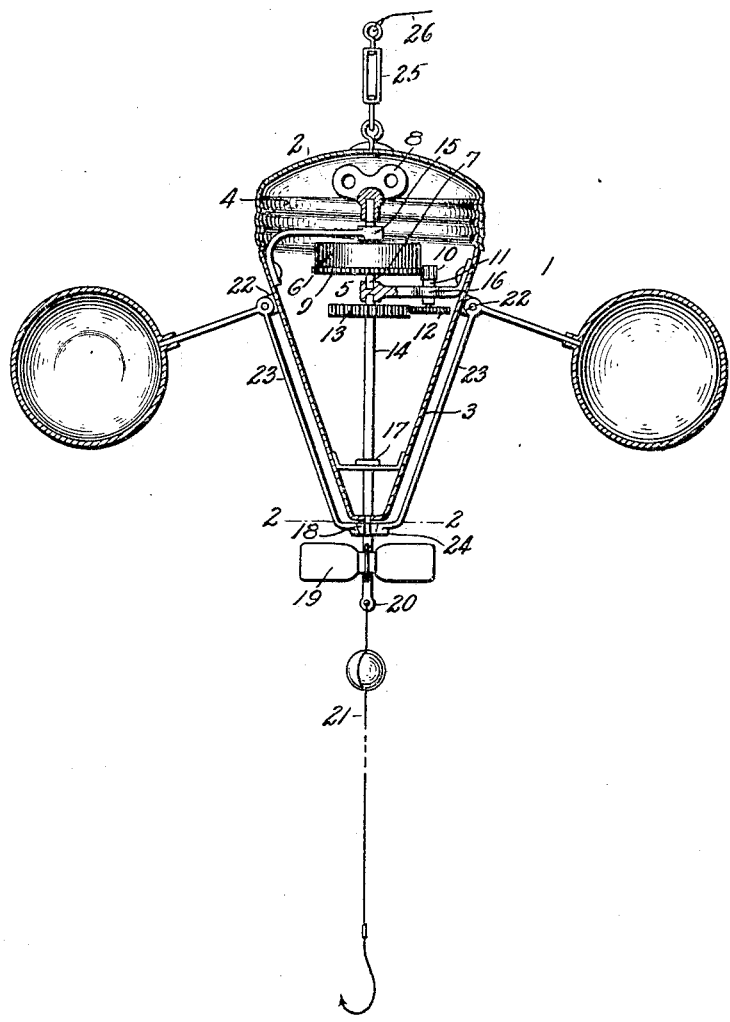

No. 788,047. PATENTED APR. 25, 1905.
O. HOLZ & P. HAERRY.
BAIT MOVING DEVICE.
APPLICATION FILED OCT. 31, 1904.

WITNESSES:
George H. Thornton
George H. Tilden

INVENTORS:
Otto Holz,
Paul Haerry,
By Edward Williams, Jr. Atty.

No. 788,047.                                                        Patented April 25, 1905.

UNITED STATES PATENT OFFICE.

OTTO HOLZ AND PAUL HAERRY, OF SCHENECTADY, NEW YORK.

BAIT-MOVING DEVICE.

SPECIFICATION forming part of Letters Patent No. 788,047, dated April 25, 1905.

Application filed October 31, 1904. Serial No. 230,689.

*To all whom it may concern:*

Be it known that we, OTTO HOLZ and PAUL HAERRY, citizens of the United States, residing at Schenectady, in the county of Schenectady and State of New York, have invented certain new and useful Improvements in Bait-Moving Devices, of which the following is a specification.

Our invention comprises a bait-moving device for fishing purposes. The ordinary float as now constructed is incapable of moving bait automatically; and the object of our device is to overcome this objection.

Another object of our invention is to continually keep live, dead, or artificial bait moving when in the water. Heretofore in "still" fishing it has been customary to keep pulling the line in one direction or the other to attract the fish. This is objectionable, as it requires constant attention on the part of the user. By our improved device the bait is moved automatically without pulling on the line. This is performed by a suitable motor to which the bait is attached. Devices have been constructed with the motor mechanism inside of the bait. This is objectionable for certain reasons.

A further object of our invention is to place the motor mechanism for moving the bait outside of the same.

The float comprises a casing in which is mounted a stored-up-energy device or motor. The stored-up-energy device or motor may consist of a flat coiled spring which is incased in a drum, the active end of said spring being secured to a shaft. In working relation to the shaft is a suitable gearing. A main driven shaft which is journaled in the casing is provided with a stop device consisting of a ratchet-wheel which is under the control of ball-carrying levers, which permit the main shaft to revolve. When the float is placed in the water, the ball-carrying levers are raised, due to their buoyancy, and disengage the flattened teeth of the levers in engagement with the ratchet-teeth, allowing the shaft to rotate. If the float is withdrawn from the water, the weight of the ball-carrying levers will bring the flattened teeth into engagement with the ratchet, thereby arresting its further rotation. The extreme lower end of the shaft acts as the bait-suspending means, and secured to the shaft in proximity to the means a retarding device is mounted, which tends to limit the rotation of the shaft when in operation.

To this end our invention consists of a float associated with a motor of any suitable character, either mechanical or electrical, which may receive energy from an outside source. The function of the motor is to agitate the bait directly or indirectly.

Figure 2:
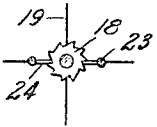

In the accompanying drawings, which form a part of this specification, Figure 1 is a vertical section of a float, showing the motive device inclosed therein and its coöperating parts; and Fig. 2 is a detail view on line 2 2 of Fig. 1, showing the stop mechanism or means for releasing the motor.

Referring now to Fig. 1, the float 1 comprises a two-part casing, the upper part of which is the cap 2, forming a removable cover, which is screwed onto a shell 3. The upper part of the shell is provided with a threaded portion 4, with which the cap 2 engages. In the float is a spring-motor 5, which comprises a flat coiled spring contained in the drum 6 and attached at its active end to a shaft 7. The shaft is provided at its end with a key 8, which is accessible, by removing the cap 2, for winding up the spring. Formed on the drum 6 is a gear 9, which meshes with a pinion 10, having a shaft 11, on the end of which is another pinion, 12, meshing with a gear 13. The gear 13 is secured to a shaft 14, and shafts 7, 11, and 14 are journaled in bearings 15, 16, and 17, the former two being in the upper portion of the shell and the latter in the lower portion thereof. The shaft 14 passes through the shell at its lower end and is provided with a ratchet-wheel 18 and a retarding device 19, which consists of a fan that keeps down the speed of the motor. At the extreme end of the shaft 14 an eye 20 is formed, to which is secured a bait-suspending wire, line, or other means 21. Mounted on the sides of the shell 3 are two bearings 22, and mounted to turn therein is a pair of ball-carrying levers 23, having flattened teeth 24 engaging the ratchet-wheel 18, as shown in Fig. 2, to prevent the coiled spring in the drum 6 from unwinding until it is in condition for fishing—that is, until the float has been lowered into the water. The cap 2 is provided with a small turnbuckle 25, to which is secured the fishing-line 26.

The operation of our device is as follows: After the bait has been secured in the desired manner the cap 2 is removed, allowing free access to the cap for winding up the motor. The motor having been wound up and the cap screwed into place, the float is then lowered into the water. When the float comes in contact therewith, the ball-carrying levers are raised by their buoyancy and the motor is allowed to rotate, due to the fact that the teeth are disengaged from the ratchet-wheel. When the shaft is rotating, it turns the bait.

In accordance with the provisions of the patent statutes we have described the principle of operation of our invention, together with the apparatus which we now consider to represent the best embodiment thereof; but we desire to have it understood that the apparatus shown is only illustrative and that the invention can be carried out by equivalent means.

What we claim as new, and desire to secure by Letters Patent of the United States, is—

1. In a fishing device, the combination of a bait-suspending line, and a motor operatively related to said line for producing motion thereof.

2. A bait-moving device, comprising the combination of a float, a bait-suspending means connected to said float, and a motor.

3. A bait-moving device, comprising the combination of a float, a motor, and means outside of the float for controlling the movements of the motor.

4. A bait-moving device, comprising the combination of a float, a motor, a device for limiting the rotation of the motor, and automatic means for starting and stopping the motor.

5. A bait-moving device, comprising the combination of a float, a motor, and a retarding device for the motor.

6. A bait-moving device, comprising the combination of a float, a motor, and a means to which the bait is suspended under the control of the motor.

7. A bait-moving device, comprising the combination of a float, a motor, a means to which the bait is suspended, and automatic means for controlling the operation of the motor.

8. In a bait device, the combination of a float, a motor, gearing therefor, a shaft, and a bait-suspending means attached thereto.

9. In a bait device, the combination of a float, a motor, gearing therefor, a shaft, and a retarding means attached to said shaft.

10. In a bait device, the combination of a float, a motor, and means for starting said motor.

11. In a bait device, the combination of a two-part float, a removable cap, a motor, and means for controlling said motor.

12. In a bait device, the combination of a float, a motor, and automatic means for starting or stopping the motor.

In witness whereof we have hereunto set our hands this 28th day of October, 1904.

OTTO HOLZ.
PAUL HAERRY.

Witnesses:
EDWARD WILLIAMS, Jr.,
ELNATHAN E. BRIGGS.